United States Patent [19]
Dornbush et al.

[11] Patent Number: 5,420,393
[45] Date of Patent: May 30, 1995

[54] ASSEMBLIES FOR INCREASING AIRFLOW AND HEATING EFFECIENCY IN A MULTI-SHELF FOOD HEATING DEVICE

[75] Inventors: David A. Dornbush, Prior Lake; Steven M. Alseth, Cologne; Chad S. Erickson, Plymouth, all of Minn.

[73] Assignee: American Harvest, Inc., Chaska, Minn.

[21] Appl. No.: 182,624

[22] Filed: Jan. 14, 1994

[51] Int. Cl.[1] ............................ F27D 7/04; F24H 3/04
[52] U.S. Cl. .................................... 219/400; 219/386
[58] Field of Search ............... 219/400, 385, 386, 387; 126/21 A, 21 R

[56] References Cited

U.S. PATENT DOCUMENTS

| | | |
|---|---|---|
| 3,033,633 | 5/1962 | Holloway .......................... 219/400 |
| 3,676,986 | 7/1972 | Reiling ............................. 55/472 |
| 3,926,537 | 12/1975 | Piper ................................ 417/353 |
| 3,935,489 | 1/1976 | Church ............................. 310/90 |
| 4,190,965 | 3/1980 | Erickson .......................... 219/400 |
| 4,200,257 | 4/1980 | Litch ................................ 248/604 |
| 4,224,743 | 9/1980 | Erickson et al. . | |
| 4,236,063 | 11/1980 | Glucksman ...................... 219/400 |
| 4,252,547 | 2/1981 | Johnson ........................... 55/234 |
| 4,380,126 | 4/1983 | Roberts . | |
| 4,531,306 | 7/1985 | Erickson . | |
| 4,536,643 | 8/1985 | Erickson . | |
| 4,763,568 | 8/1988 | Kiczek ............................. 219/400 |
| 5,066,851 | 11/1991 | Darvin ............................. 219/400 |
| 5,235,906 | 8/1993 | Hsu . | |

*Primary Examiner*—Teresa J. Walberg
*Attorney, Agent, or Firm*—Merchant, Gould, Smith, Edell, Welter & Schmidt

[57] ABSTRACT

Assemblies for increasing airflow and heating efficiency in a multi-shelf food heating device having a base, a plurality of circular vertically stacked trays, and a top, wherein the airflow within the device is assisted by a fan is disclosed. One assembly involves a biasing system supported in the base for biasing the motor in place. Another assembly involves a thin, substantially planar constructed heater and a radial fan supported within a chamber of the base of the device, wherein the heater is aligned with the movement of the airflow within the chamber so that the airflow therein is substantially unobstructed by the heater. Another assembly involves providing the base with a wall substantially surrounding and adjacent an air inlet in the base to define a cavity into which substantially all of the airflow from the air inlet is directed, so that the motor is continuously cooled during operation of the device.

17 Claims, 9 Drawing Sheets

ASSEMBLIES FOR INCREASING AIRFLOW AND HEATING EFFECIENCY IN A MULTI-SHELF FOOD HEATING DEVICE

FIELD OF THE INVENTION

The present invention relates to a multi-shelf food heating device. More particularly it relates to a motor biasing and cooling assembly, and a heater/fan assembly for increasing airflow and heating efficiency in such a device.

BACKGROUND OF THE INVENTION

Devices having a plurality of shelves for heating food products are well known in the art. One common use for such a device is for the preservation of food by dehydration. Examples of such devices are disclosed in U.S. Pat. Nos. 4,190,965 and 4,536,643, which are incorporated herein by reference. Specifically, food to be dried is placed on a plurality of shelves within a cabinet. The dehydrator typically draws air through openings in the base, heats it, and then circulates the air throughout the dehydrator.

Air typically is drawn in and circulated by a motor-driven fan contained within the dehydrator. In order to draw in and circulate sufficient quantities of air, the motor typically drives the fan at relatively high speeds. Consequently, the motor tends to vibrate during operation, which in turn produces noise. Furthermore, conventional motor assemblies in such devices are subject to high labor costs during assembly.

These problems are exacerbated by the fact that the heater coil typically used in dehydrators and the method for mounting the coil obstruct the flow of air. The width of the heater coil itself is often at least one quarter inch thick. Furthermore, the support members used to support the heater are often numerous and bulky in order to provide sufficient support to the heater. As a result, the motor must work even harder to drive the fan at the speed necessary to create sufficient airflow throughout the dehydrator.

Due to the high level of motor activity mentioned above, it can be important that sufficient quantities of air are directed over the motor to prevent it from overheating. This is especially important since many motors typically used in dehydrators are inefficient. One example of such a motor is the shaded pole motor, which runs at only 40-50% efficiency. As a result, the motor can become extremely hot during use. In addition, such air flow over the motor can help heat the air to be circulated within the dehydrator. Currently, much of the air drawn in through base openings is spread throughout the base region before it is directed up and over the motor. As a result, the quantity of the air directed over the motor as compared with that initially drawn in through the base of the device is significantly reduced.

Accordingly, there is a need for a multi-shelf food heating device which provides for more efficient airflow throughout the device. In particular, there is a need for a multi-shelf food heating device having a motor biasing assembly which permits easy assembly of the motor into the device as well as prohibiting movement or vibration of the motor during operation of the device. There is also a need for such an assembly which has a motor cooling configuration for preventing the motor from overheating during use and for assisting in the heating of air to be circulated. There is a further need for a multi-shelf food heating device having a heater and fan assembly which provides for substantially unobstructed airflow within the device.

SUMMARY OF THE INVENTION

The present invention fulfills the need for a multi-shelf food heating device having improved airflow and heating efficiency. More particularly, one aspect of the present system relates to a motor and base assembly for use in a multi-shelf food heating device having a base, a plurality of circular vertically stacked trays, and a top, wherein the airflow within the device is assisted by a fan. The assembly may include a motor mounted to the base and configured to drive the fan, and a biasing system supported within the base for biasing the motor in place. The biasing system includes at least one biasing member flexibly projecting from a surface of the biasing system and configured to engage the motor in order to prevent movement of the motor during operation of the device. Such a biasing system can also be configured to enable highly efficient and low-cost assembly of the motor into the device.

Another aspect of the present system may include a motor and base assembly for use in such a device, wherein the assembly includes a motor mounted to the base and configured to drive the fan, a wall projecting from the base from which a cavity in which to house the motor is formed, a cover removably attached to the wall and at least partially covering the cavity, and a biasing system for biasing the motor in position. The biasing system includes at least one biasing member flexibly projecting from a surface of the wall, the base, or the cover for engaging the motor in order to prevent movement of the motor during operation of the device.

Yet another aspect of the present system relates to a heater and a fan assembly for use in such a device, wherein the assembly includes a dividing member supported within the base and configured to divide the base into an upper region and a lower region, and a cover positioned above the dividing member to cover the upper region of the base. The cover is preferably configured with the dividing member to create a chamber in which to house the fan. The fan is preferably configured to move airflow in a substantially outwardly, radial direction within the chamber. The fan is preferably configured to move the airflow in a substantially outwardly, radial direction within the chamber. The assembly further includes a heater having a thin, substantially planar construction and configured to heat the airflow within the chamber. The heater preferably surrounds the fan and is aligned with the movement of the airflow within the chamber. The assembly also includes a support preferably projecting from the base and configured to support the heater within the chamber. When assembled, the airflow within the chamber is left substantially unobstructed by the heater.

Yet another aspect of the present system relates to a motor and base assembly for use in such a device, wherein the assembly includes a motor mounted to the base and configured to drive the fan, an air inlet defined by the base proximate the motor and adapted to receive a flow of air from the atmosphere, and a wall projecting from the base and substantially surrounding the air inlet to define a cavity into which substantially all of the airflow from the air inlet is directed so that the motor is continuously cooled during operation of the device.

DETAILED DESCRIPTION OF THE PREFERRED EMBODIMENTS

Figure 1:
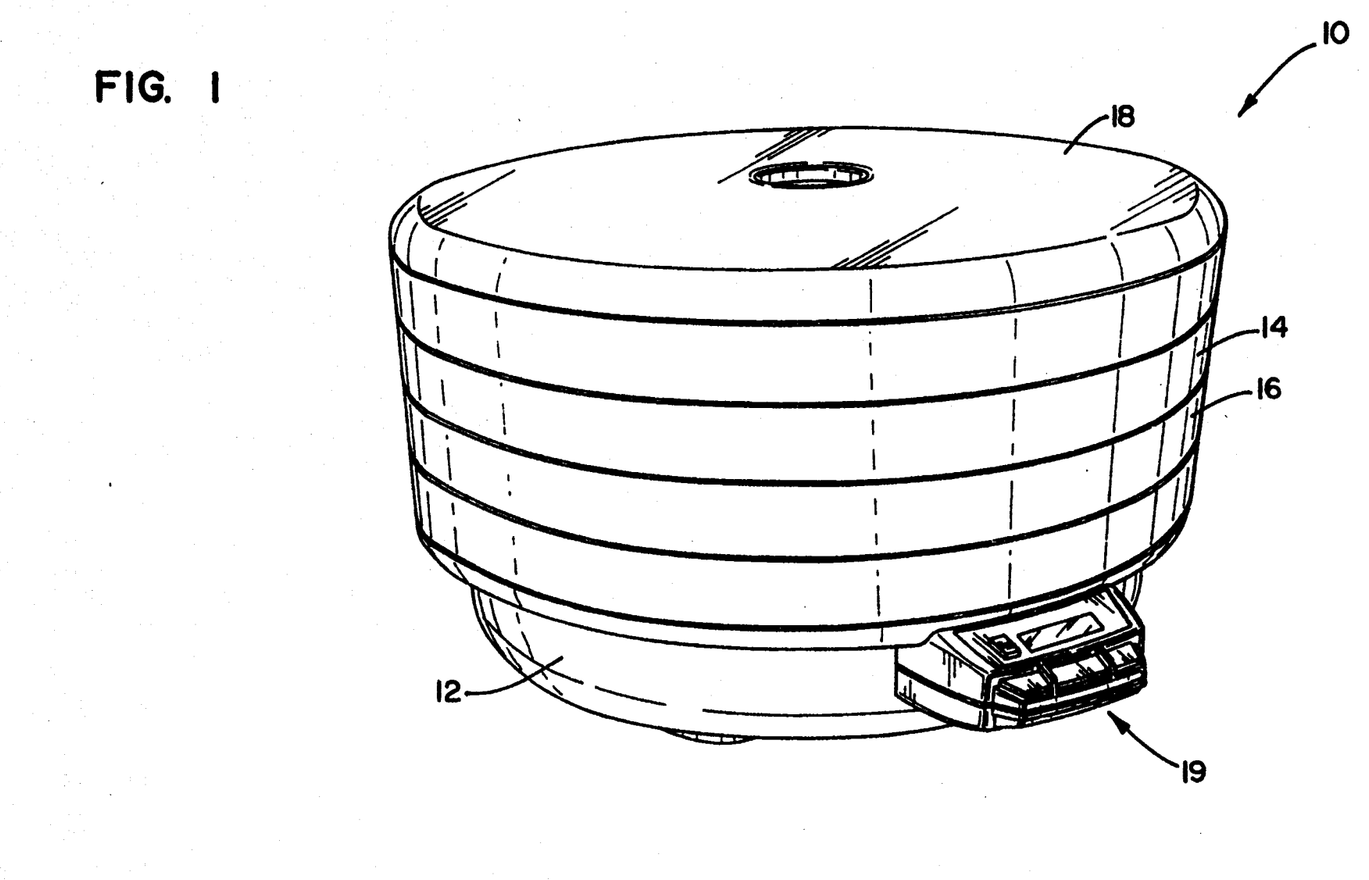
FIG. 1 shows a perspective view of one preferred embodiment of a multi-shelf device for heating food products.

One preferred embodiment of a multi-shelf device for heating food products is illustrated in FIG. 1. As can be seen from FIG. 1, the device shown is a food dehydrator. It can be appreciated, however, that a food dehydrator was chosen merely for illustrative purposes. The present invention may apply to other multi-shelf heating devices.

The food dehydrator 10 as shown in FIG. 1 may include a base 12, a plurality of trays, such as 14 and 16, and a top member 18. The base 12, trays 14 and 16, and top member 18 may be suitably formed such as by injection molding of a thermoplastic material.

Figure 2:
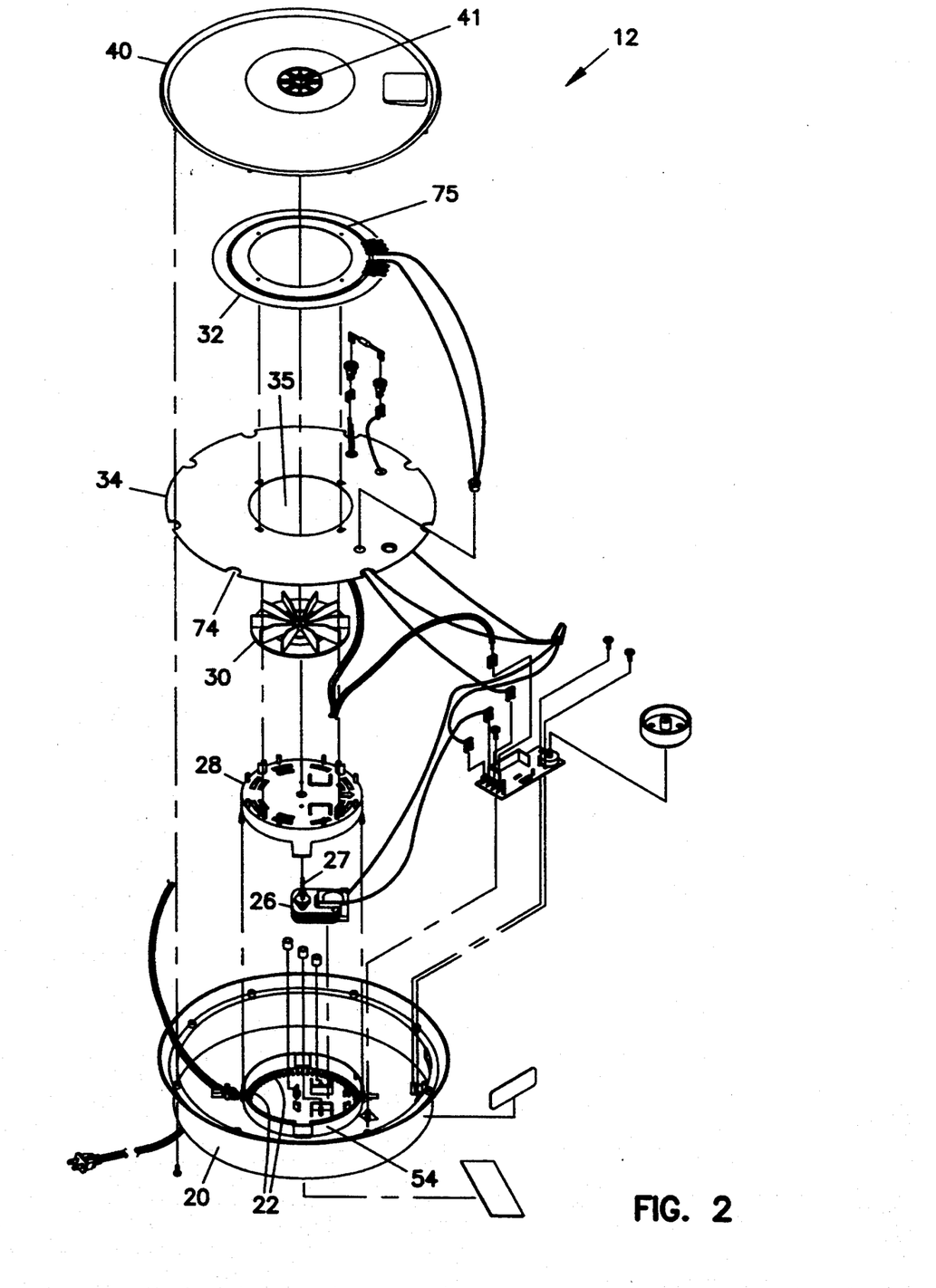
FIG. 2 is an exploded top view of a base of the device of FIG. 1.

The major components of base 12 are illustrated in more detail in FIG. 2. As shown, base 12 preferably includes a housing 20 having a plurality of openings 22 which collectively serve as an air inlet for food dehydrator 10. Base 12 may also include a motor 26 mounted within housing 20, and a cover 28 for at least partially covering motor 26. Base 12 also preferably includes a fan 30 mounted on a shaft 27 of motor 26. Fan 30 is driven by motor 26 and circulates the air drawn in through the air inlet formed by openings 22. In the embodiment shown, cover 28 supports a heater 32, which is the primary system for heating the air circulated by fan 30. A plate 34 supported by housing 20 may also be provided for dividing base 12 into a lower region 36 and an upper region 38 (see FIG. 3). Plate 34 preferably includes a centrally located opening 35 for receiving fan 30 and heater 32 so that fan 30 and heater 32 are contained within upper region 38. Housing 20 is shown supporting a base cover 40 for covering base 12. Each of these components will now be described in further detail below.

Figure 3:
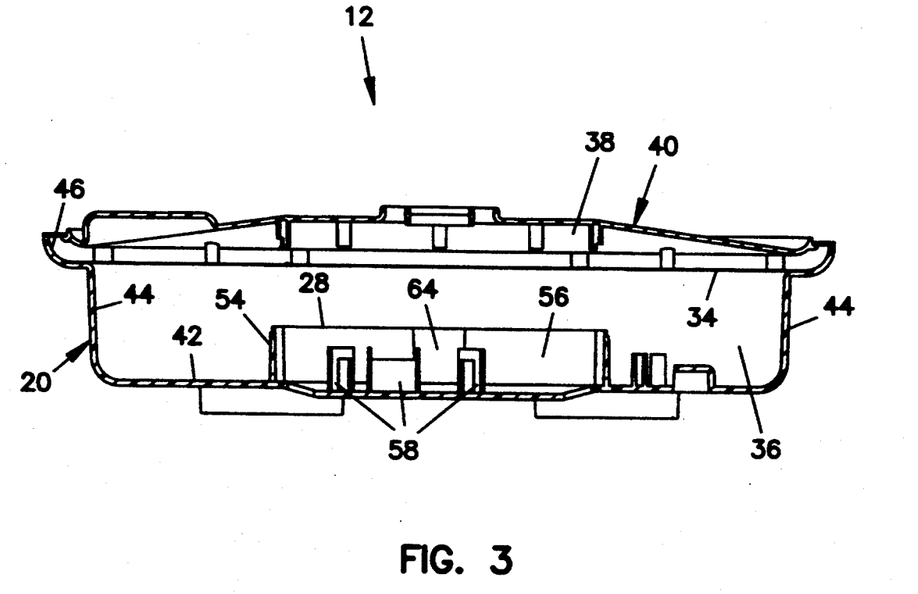
FIG. 3 is a cross-sectional side view of the base of FIG. 2.

With reference to FIG. 3, base 12 includes a floor 42, a generally cylindrical side wall 44 projecting upwardly from floor 42, and a base cover 40. Side wall 44 preferably includes a lip 46 formed along the upper edge of side wall 44 to support plate 34 and base cover 40.

For ease of assembly, base cover 40 is preferably removably attached to housing 20. Accordingly, base cover 40 includes a plurality of projection members 50 (see FIG. 5) projecting downwardly towards lip 46 (see FIG. 4). As is further shown in FIG. 4, lip 46 may include a plurality of holes 48 aligned with and adapted to receive projection members 50 in order to secure base cover 40 to housing 20. Projection members 50 are preferably flexible to snap into and out of holes 48. Preferably, the diameter of holes 48 is slightly smaller than the diameter of projection members 50 to ensure a tight fit between base cover 40 and housing 20.

Referring back to FIG. 3, housing 20 is further shown to include a circumferential wall 54 projecting upwardly from floor 42 for defining a cavity 56 in which motor 26 may be disposed. In the embodiment shown, motor 26 is supported within cavity 56 by mounting members 58 projecting from floor 42.

Figure 4:
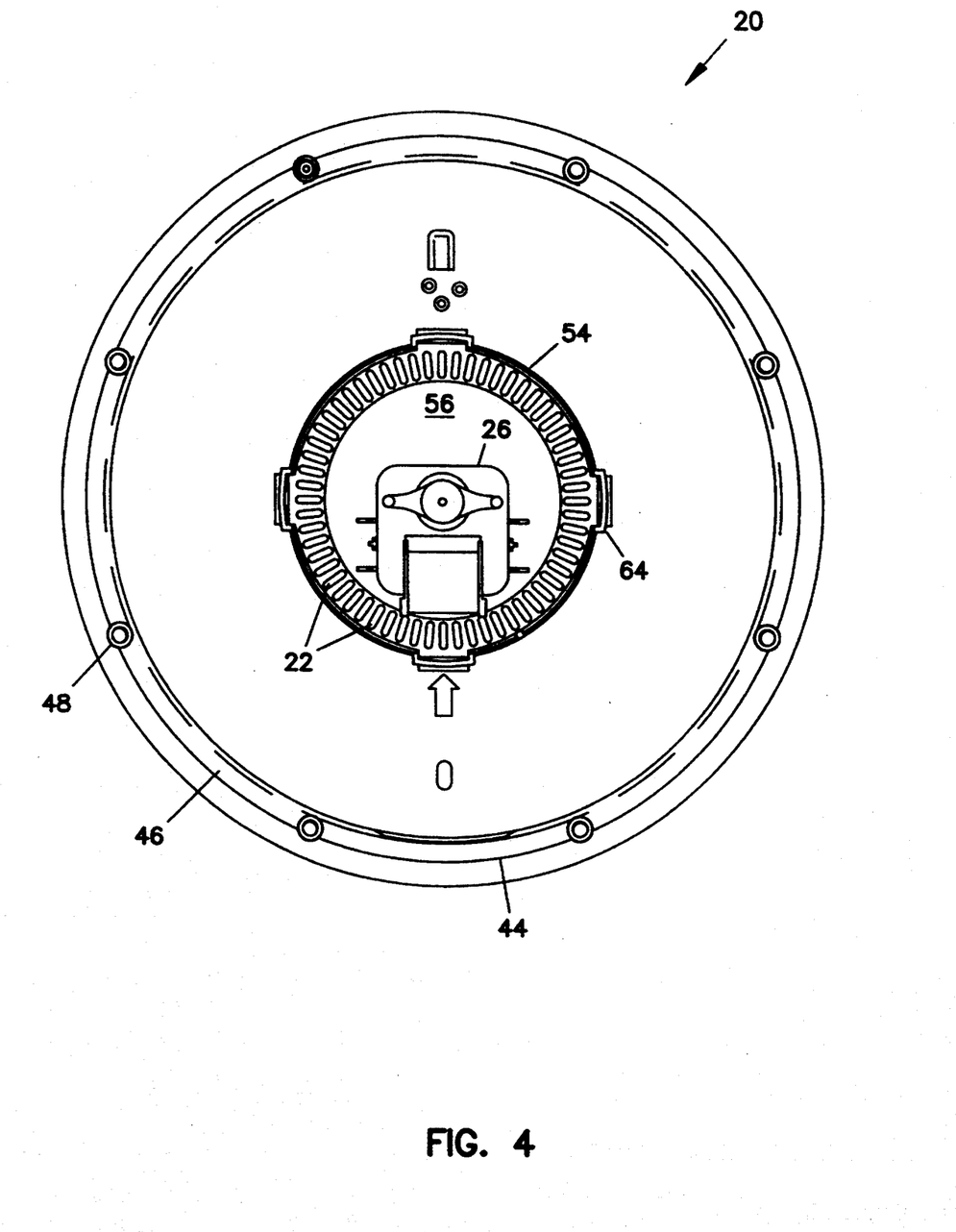
FIG. 4 is a top view of a housing of the base of FIG. 2.

As can best be seen in FIG. 4, wall 54 preferably encloses the air inlet comprising openings 22 so that substantially all of the air drawn in through openings 22 is directed through cavity 56 and across motor 26. This directed flow of air helps heat the airflow and also helps cool motor 26 during use and hence, helps prevent motor 26 from overheating. The amount of air drawn over motor 26 is maximized when wall 54 has substantially the same shape as the air inlet formed by openings 22 and when it is placed just outside the outer periphery of the air inlet. Accordingly, since the air inlet comprising openings 22 shown in FIG. 4 is circular, wall 54 has also been shown to be circular in shape, and has been placed substantially adjacent the outer circumference of the air inlet.

The shape of wall 54, however, is not critical. Any shaped wall which generally encloses the air inlet may also be used. For example, a rectangular-shaped wall enclosing all of the openings 22 of the air inlet could equally have been used with the air inlet while still maintaining circulation of air across motor 26.

Cover 28 is shown at least partially covering cavity 56 created by wall 54. As can best be seen in FIG. 6, cover 28 has a substantially planar top surface 60, and a plurality of extension members 62 projecting downwardly from top surface 60 towards base 12. Accordingly, wall 54 is provided with a plurality of pockets 64 (see FIGS. 3 and 4) aligned with and adapted to receive extension members 62 so that cover 28 may be secured to housing 20 of base 12. For ease of assembly, extension members 62 are preferably flexible to snap into and out of pockets 64. Alternatively, wall 54 and cover 28 may be replaced by a uniform enclosure member (not shown). Cover 28, however, is preferably removable and does not form part of base 12, so that, for example, it may be easily replaced if damaged. As also previously noted, using a cover 28 with extension member 62 as shown which efficiently clips into pockets 64 results in highly efficient assembly.

Figure 6:
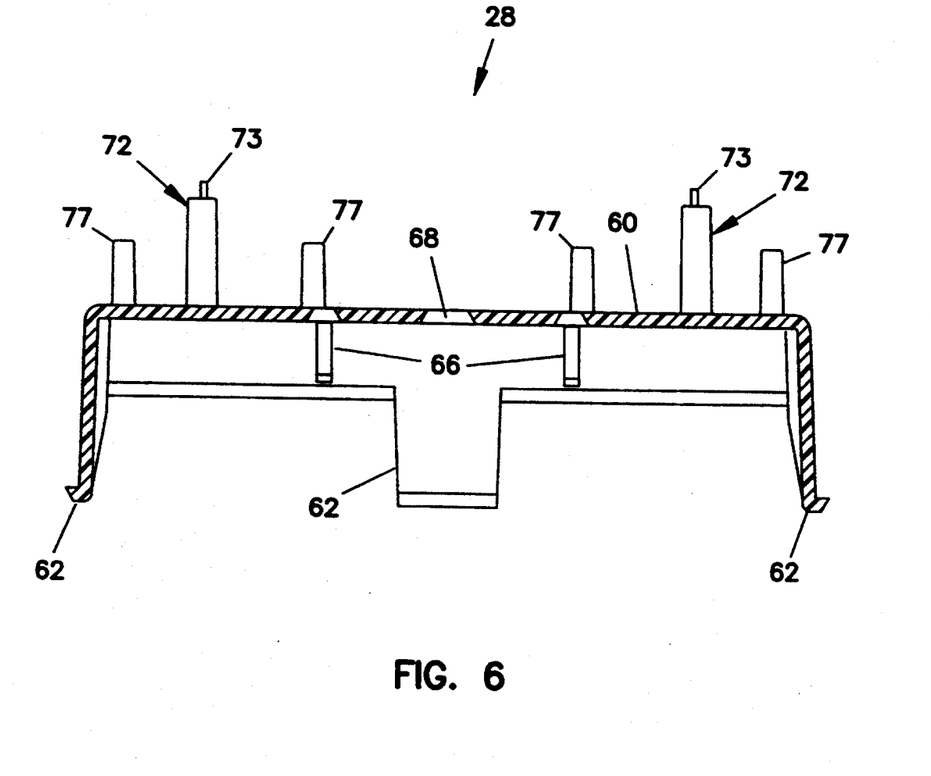
FIG. 6 is a cross-sectional side view of a motor cover of the device of FIG. 1.

Cover 28 also preferably includes a plurality of biasing members 66 projecting downwardly from top surface 60 of cover 28 towards motor 26. Biasing members 66 are preferably flexible and extend to bias against the upper surface of motor 26 when cover 28 is secured to base 12. Alternatively, biasing members 66 could protrude from other surfaces in base 12, such as wall 54 or housing floor 42 (not shown). Likewise, biasing members 66 could be replaced by a single biasing member (not shown). Such engagement between cover 28 and motor 26 serves to prevent motor 26 from moving or vibrating during operation of the device. Alternatively, motor 26 may be secured to floor 42 such as by screws (not shown). However, use of screws would likely increase assembly costs.

Figure 7:
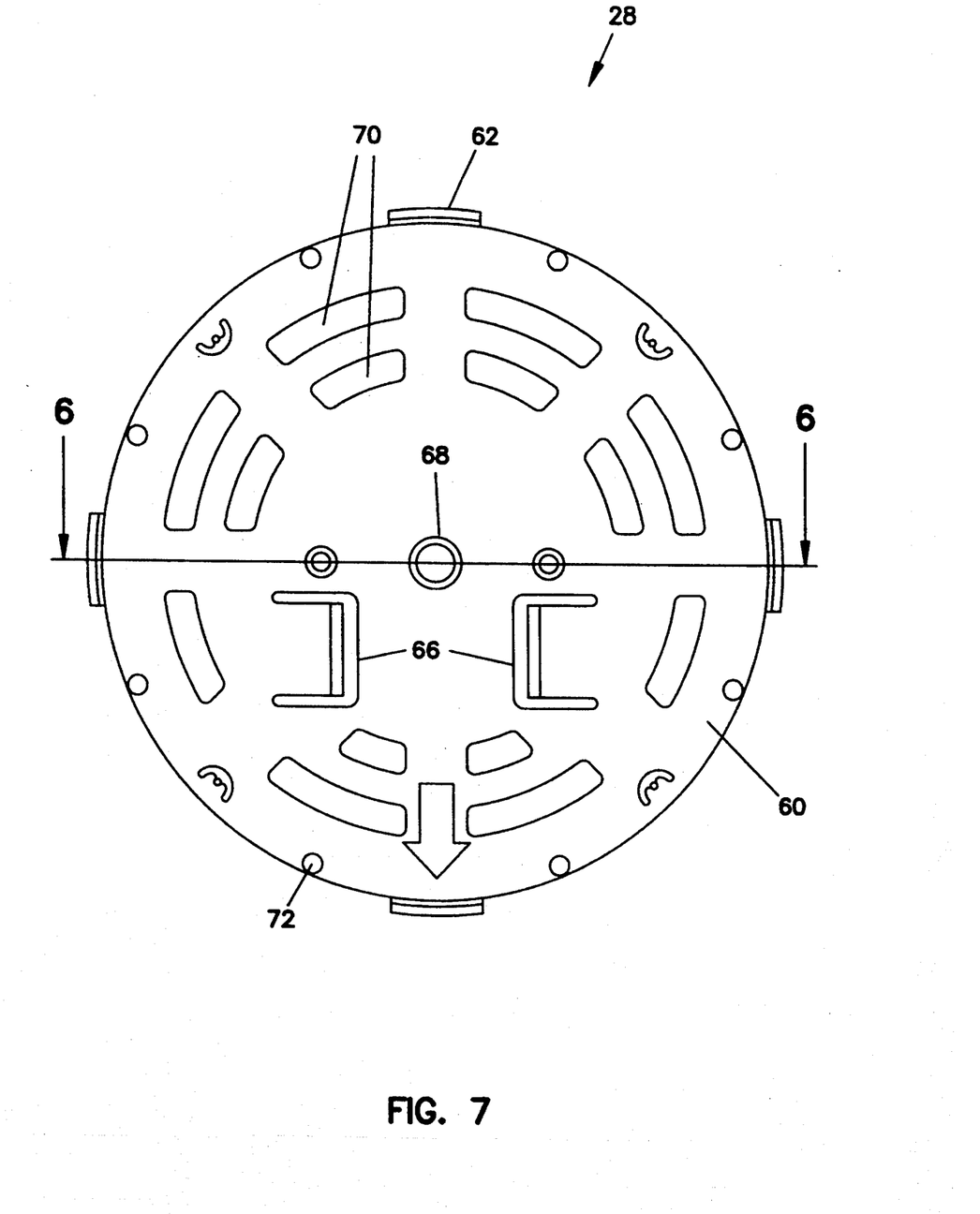
FIG. 7 is a top view of the motor cover of FIG. 5.

As can best be seen in FIG. 7, top surface 60 of cover 28 may include a centrally located opening 68 for receiving motor shaft 27 upon which fan 30 is mounted. Top surface 60 may further include a single opening (not shown) or a plurality of openings 70 through which air drawn in from base 12 via cavity 56 may be directed. Openings 70 are preferably positioned between the far outside diameter and the outer periphery of top surface 60 so that the air drawn in through openings 70 is not obstructed by fan 30. With further reference to FIG. 6, cover 28 may include a plurality of support members 77 for contacting the middle portion of plate 34. Support members 77 provide support to plate 34 as it rests on lip 46 of base 12.

Air drawn in through openings 70 is directed throughout the chamber of upper region 38 of base 12 by fan 30. Fan 30 is preferably a radial-type fan configured to move the airflow in a substantially outwardly, radial direction within upper region 38. However, it can be appreciated that other fans could be used, such as, for example, an axial fan (not shown).

Referring back to FIG. 6 as well as again to FIG. 7, cover 28 may also include a plurality of support members 72 projecting upwardly from top surface 60 for supporting heater 32. Support members 72 preferably have a thin, pin-like end 73 members. Heater 32 is an electrical resistance heater. Heater 32 preferably has a thin, substantially planar construction with a plurality of openings 75 for receiving pin-like end members 73 of support members 72. The diameter of openings 75 in heater 32 is preferably only slightly larger than the diameter of pin-like ends 73 to minimize movement of heater 32 during use. One example of such a heater comprises a resistance element of ribbon material made of FeCrAl resistance wire having a total resistance of approximately 30 ohms. Such a heater element may be purchased from Hartford under Part No. 400-0180. Accordingly, such a heater configuration, particularly when supported by a radial fan such as 30, reduces the amount of resistance to the radial airflow away from a radial fan such as 30 within upper region 38 and thus, increases the airflow efficiency therein. Preferably, heater 32 is coplanar with and adjacent fan 30 so that the air being thrown off the blades of fan 30 is immediately heated. It can be appreciated, however, that heater 32 may be placed further away from fan 30 without significantly affecting the heating of the airflow.

In the embodiment shown, fan 30 and heater 32 are housed within upper region 38 created by plate 34. As can be seen in FIG. 2, plate 34 is preferably made of a thin, substantially planar piece of metal and defines an opening 35, which fits over fan 30 for assembly. Plate 34 further preferably includes a plurality of openings 74 aligned with and adapted to receive projection members 50. When assembled, plate 34 is supported by lip 46 so that plate 34 is flush with top surface of support members 77 of motor cover 28. The diameter of openings 74 in plate 34 is preferably only slightly larger than the diameter of holes 48 in lip 46 to minimize movement of plate 34 during use.

Figure 5:
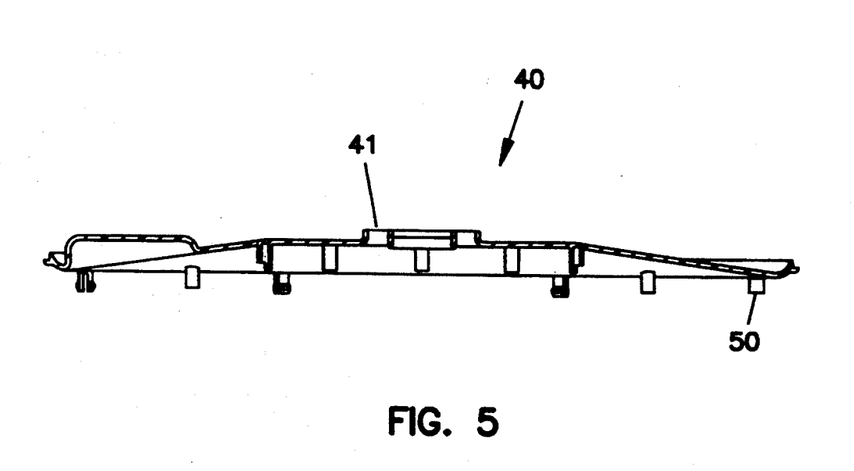
FIG. 5 is a cross-sectional side view of a base cover of the device of FIG. 1.
Figure 8:
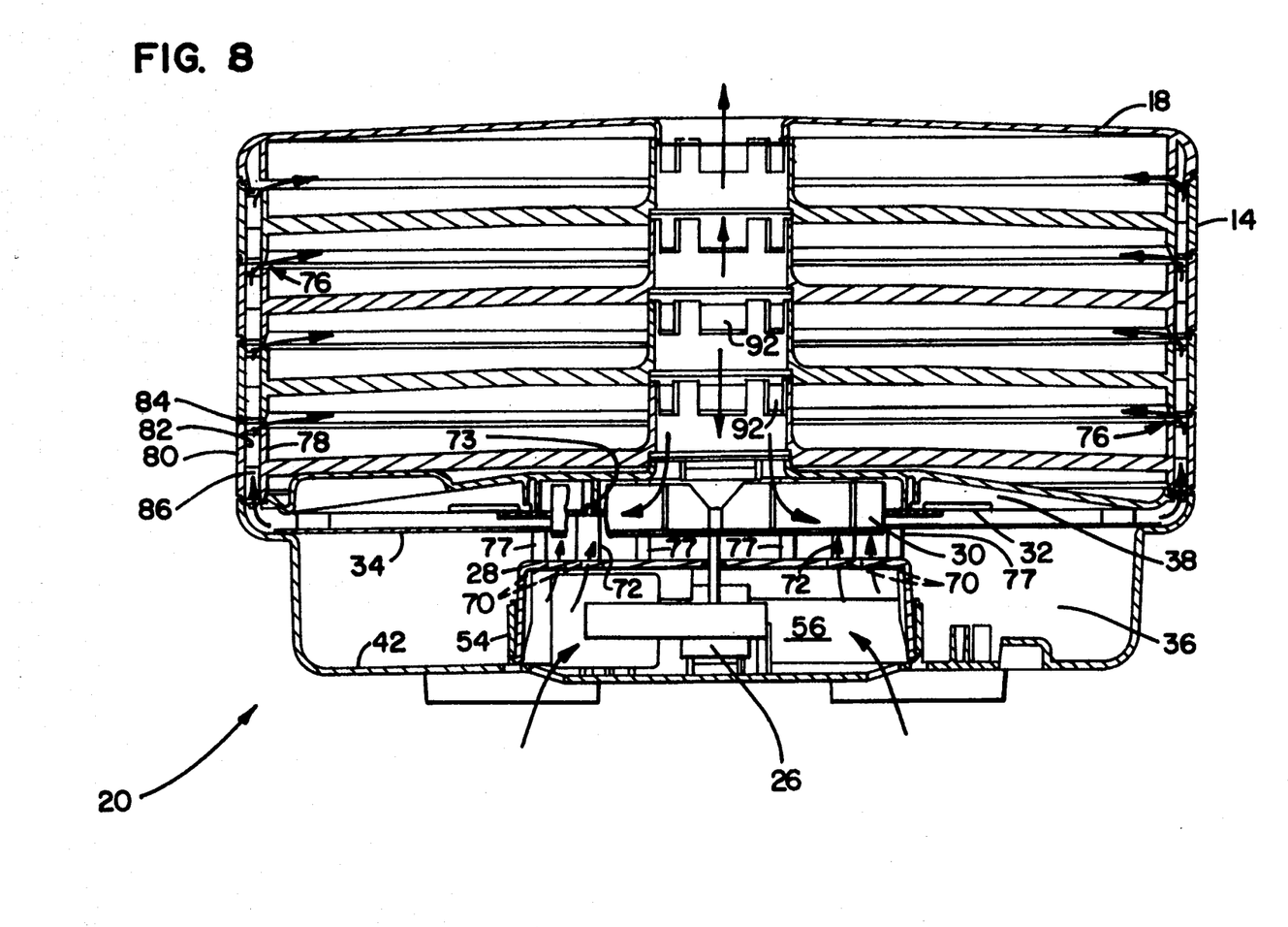
FIG. 8 is a cross-sectional view of the device of FIG. 1.

Base cover 40 includes a centrally located opening 41 for allowing the airflow from the trays to return to base 12 (see FIGS. 5 and 8). The plurality of stackable trays are illustrated by preferred tray 14 shown in FIGS. 8 and 9. Tray 14 may include an inner wall 78 and an outer wall 80 to provide an air duct 86. Wall 80 may also have a channel 84 defined therein for engagement of the next higher tray. Such engagement serves to lock the trays against axial movement.

Each of the walls 78 and 80 run circumferentially around the tray 14. It is to be noted that duct 86 opens downwardly to receive air and upwardly to pass on at least a portion of the air so received through a passage 76. A plurality of slit-like openings 92 are provided at the end of passage 76 closest to the center of tray 14 to serve as a duct to return a portion of the airstream to the fan 30 and a portion of the airstream upwardly through the adjacent trays to the atmosphere.

Figure 9:
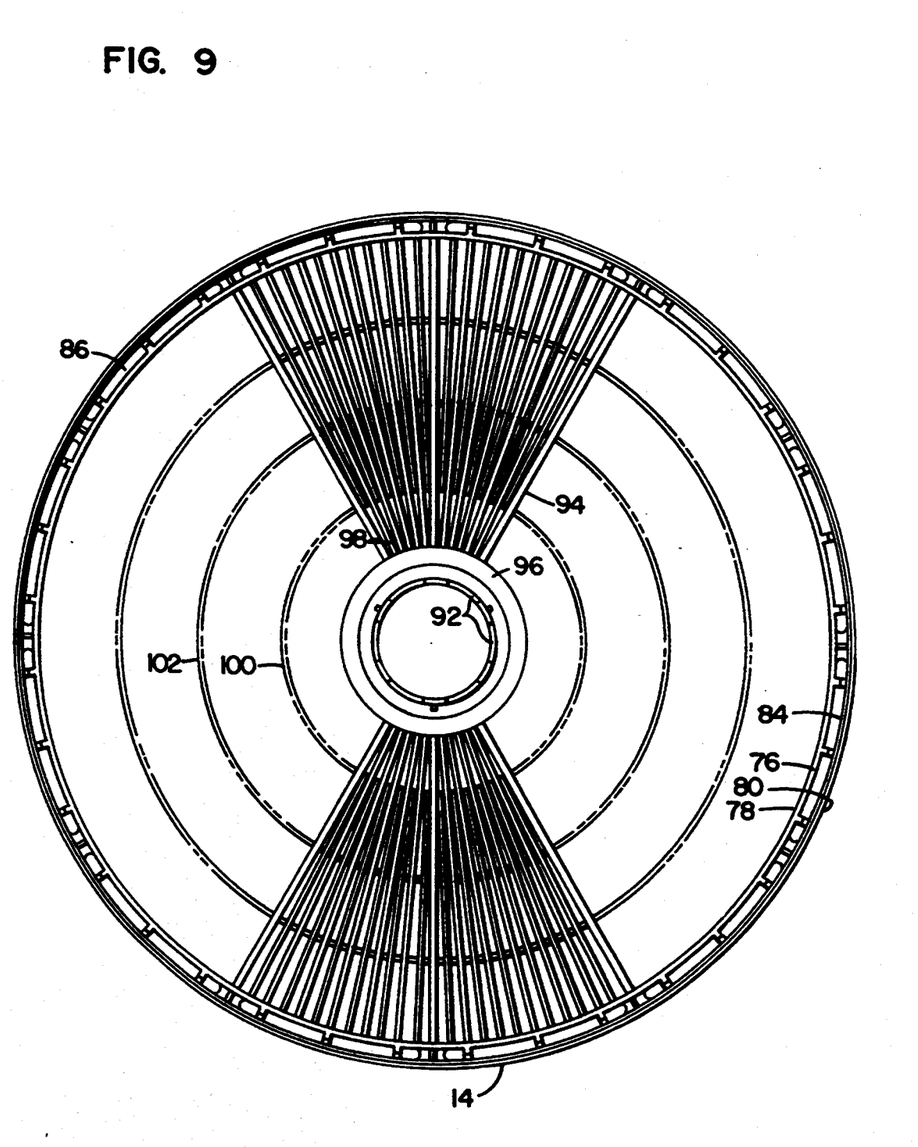
FIG. 9 is a top view of a tray of the device of FIG. 1.

The surface of tray 14 may be comprised of a plurality of spoke-like members 98 as illustrated in FIG. 9. The spokes 98 may also be supported by ring-like ribs 100 and 102. Space may be provided between each of the spoke-like members 98 so that air may pass through tray 14.

OPERATION OF THE PREFERRED EMBODIMENT

The operation of the present invention will be detailed hereinafter with reference to FIGS. 2, 8, and 9 in order to provide a more complete understanding of the present invention. The dehydrator 10 may be placed in operation by manually moving a switch 19 (see FIG. 1) from an "off" position to an "on" position. When switch 19 is in the "on" position, motor 26 is activated and electrical current is fed to heater 32. Due to biasing members 66 of cover 28, however, vibration of motor 26 is minimized during use. Motor 26 drives fan 30. Fan 30 pulls an airstream into the dehydrator 10 through openings 22 in floor 40. Due to wall 54 and cover 28, substantially all of the airstream pulled in through cavity 56 is directed across motor 26.

Fan 30 further draws the airstream through openings 70 moving the airstream radially outwardly across upper region 38 to air duct 86 of tray 14. Since heater 32 is aligned with the direction of the airflow, and due to the nonobtrusive construction of heater 32, the airstream circulated by fan 30 through upper region 38 is left substantially unimpeded.

A portion of the airstream then moves through passage 76 and subsequently passes across the food product which is supported on spoke-like members 98 (see FIG. 9). Since spokes 98 are aligned with the direction of airflow, they do not create a disturbance in the airstream. Spokes 98 also permit air to move beneath the food product and between adjacent spokes. The air after passing through passage 76 is directed through openings 92 and may either move upwardly and out of dehydrator 10 or downwardly into fan 30 for recirculation through trays 14, 16, and the like.

The foregoing constitutes a description of various preferred embodiments. Numerous changes to the preferred embodiments are possible without departing from the spirit and scope of the invention. For example, the present assemblies may be used with any multi-shelf device used to heat food products, and is not limited to use with a food dehydrator. Hence, the scope of the invention should be determined with reference not to the preferred embodiments, but to the following claims.

What is claimed is:

1. A motor and base assembly for use in a device for heating food products with a flow of air, comprising:
   a top;
   a base;
   a fan supported within the base, the fan being configured to assist the airflow within the device;
   a plurality of vertically stacked trays removably positioned between the top and the base;
   a motor mounted within the base and configured to drive the fan; and a biasing system supported within the base for biasing the motor in position, the biasing system comprising at least one biasing member flexibly projecting from a surface of the biasing system and configured to engage the motor in order to prevent movement of the motor during operation of the device.

2. The assembly of claim 1, wherein a surface which of the biasing system comprises a motor housing cover member which at least partially covers the motor.

3. The assembly of claim 2, wherein the at least one biasing member of the biasing system downwardly projects from the motor housing cover member.

4. A motor and base assembly for use in a device for heating food products with a flow of air, comprising:
 a top;
 a base;
 a plurality of vertically stacked trays removably positioned between the top and the base;
 a fan supported within the base and configured to assist the airflow within the device;
 a motor mounted within the base and configured to drive the fan;
 a wall projecting from a portion of the base, the wall defining at least a portion of a cavity in which to house the motor;
 a cover member removable attached to the wall and at least partially covering the cavity; and
 a biasing system for biasing the motor in position, the biasing system comprising at least one biasing member flexibly projecting from a surface of the wall, the base, or the cover for engaging the motor in order to prevent movement of the motor during operation of the device.

5. The motor and base assembly of claim 4, wherein the cover member comprises at least one downwardly projecting biasing member.

6. The motor and base assembly of claim 4, wherein the cover member comprises at least one extension member flexibly projecting downwardly from the cover member; and the wall comprises at least one socket defined by the wall and adapted to receive the at least one cover extension member, so that, when assembled, the cover member is secured to the wall by the extension member being positioned into the socket.

7. A heater and a fan assembly for use in a device for heating food products, the device having a base, a top and a plurality of circular vertically stacked trays removably positioned between the base and the top, wherein the airflow within the device is assisted by a fan, the assembly comprising:
 a dividing member supported within the base and configured to divide the base into an upper region and a lower region;
 a cover configured to cover the upper region of the base so as to create a chamber in which to house a fan; and
 a heater supported above the dividing member and configured to heat the airflow within the chamber, the heater having a thin, substantially planar construction surrounding the fan and being aligned with the movement of the airflow within the chamber so that the airflow within the chamber is left substantially unobstructed by the heater.

8. The heater and fan assembly of claim 7, wherein the fan is configured to move airflow in a substantially outwardly, radial direction within the chamber.

9. The heater and fan assembly of claim 7, wherein the support comprises a plurality of mounting members upon which to mount the heater.

10. The heater and fan assembly of claim 9, wherein the plurality of mounting members have a substantially pin-like structure.

11. A motor and base assembly for use in a device for heating food products with a flow of air, comprising:
 a top;
 a base;
 a plurality of vertically stacked trays removably positioned between the base and the top;
 a fan supported within the base and configured to assist the airflow within the device;
 a motor mounted within the base and configured to drive the fan; and
 a housing at least partially enclosing the motor, the housing having at least one biasing member flexibly projecting from a surface of the housing and configured to engage the motor in order to prevent movement of the motor during operation of the device.

12. The motor and base assembly of claim 11, wherein the housing has a top cover member from which the at least one biasing member downwardly projects.

13. A motor and base assembly for use in a device for heating food products having a base, a plurality of vertically stacked trays, and a top, wherein airflow within the device is assisted by a fan; the assembly comprising:
 a fan;
 a motor mounted within the base and configured to drive the fan;
 an air inlet defined by the base proximate the motor and adapted to receive a flow of air from the atmosphere; and
 a housing at least partially surrounding the motor and projection from the base and substantially surrounding and adjacent the air inlet, the housing defining a cavity into which substantially all of the the flow of air from the air inlet is directed so that the motor is continuously cooled during operation of the device.

14. The motor and base assembly of claim 13, wherein the housing comprises a top member and a bottom member, the top member having a plurality of apertures for allowing the airflow to exit the cavity formed by the housing.

15. The motor and base assembly of claim 14, wherein the top member of the housing is removably attached to the bottom portion of the housing.

16. The motor and base assembly of claim 15, further comprising a biasing system for biasing the motor in position, the biasing system comprising at least one biasing member flexibly projecting from a surface of the housing or the base and configured to engage the motor in order to prevent movement of the motor during operation of the device.

17. An assembly for use in a device for heating food products having a base, a plurality of vertically stacked trays, and a top, wherein airflow within the device is assisted by a fan; the assembly comprising:
 a base;
 a fan;
 a motor mounted within the base and configured to drive the fan;
 an air inlet defined by the base, the air inlet located proximate the motor and adapted to receive a flow of air from the atmosphere;

a housing projecting from the base, the housing defining a cavity in which to house the motor;

a cover having at least one aperture and removably attached to the housing, the cover substantially enclosing the cavity created by the housing to direct substantially all of the airflow from the air inlet through the cavity over the motor, so that the motor is continuously cooled during the operation thereof; and a biasing system for biasing the motor in position, the biasing system comprising at least one biasing member flexibly projecting from a surface of the housing, the base, or the cover and configured to engage the motor in order to prevent movement of the motor during operation.

* * * * *

UNITED STATES PATENT AND TRADEMARK OFFICE
CERTIFICATE OF CORRECTION

PATENT NO.   :   5,420,393

DATED        :   May 30, 1995

INVENTOR(S)  :   Dornbush et al.

It is certified that error appears in the above-identified patent and that said Letters Patent is hereby corrected as shown below:

On the title page, item [75], inventors, insert -- Troy F. Boettcher, Hutchinson; Bruce G. Mitchell, Savage, -- after the word "Plymouth,"

Signed and Sealed this

Fourteenth Day of November, 1995

Attest:

BRUCE LEHMAN

*Attesting Officer*   *Commissioner of Patents and Trademarks*